United States Patent [19]

Rabe et al.

[11] Patent Number: 4,761,389
[45] Date of Patent: Aug. 2, 1988

[54] PROCESS FOR PREPARING CERAMIC MATERIALS WITH REDUCED CARBON LEVELS

[75] Inventors: James A. Rabe, Midland; Duane R. Bujalski, Monitor Township, Bay County, both of Mich.

[73] Assignee: Dow Corning Corporation, Midland, Mich.

[21] Appl. No.: 717,354

[22] Filed: Apr. 1, 1985

[51] Int. Cl.$^4$ .................. C04B 35/52; C04B 35/58
[52] U.S. Cl. ........................ 501/95; 501/88; 501/97
[58] Field of Search ............ 501/88, 90, 97, 95

[56] References Cited

U.S. PATENT DOCUMENTS

| | | | |
|---|---|---|---|
| 4,336,215 | 6/1982 | Yajima et al. | 501/88 |
| 4,405,589 | 9/1983 | Iwai et al. | 423/344 O |
| 4,517,168 | 5/1985 | Kawahito et al. | 423/344 O |

*Primary Examiner*—Mark L. Bell
*Assistant Examiner*—Karl Group
*Attorney, Agent, or Firm*—Robert L. McKellar

[57] ABSTRACT

A process for preparing ceramic materials with reduced carbon levels is described. The process involves treating a silicon-containing preceramic polymer with ammonia at a temperature of 550°–800° C. for a time sufficient to reduce the carbon content prior to pyrolysis at 900°–1500° C. Another process also involves the pyrolysis of a silicon-containing preceramic polymer in an ammonia atmosphere. The carbon level of ceramic materials produced by this invention can be controlled to a given, desired level by varying the process conditions. Suitable silicon-containing preceramic polymers include polycarbosilanes, polysilazanes, polysilanes, organosilsesquioxane-containing sol-gels, and organopolysiloxanes which are capable of being converted to ceramic materials when fired to elevated temperatures. Ceramic fibers can be prepared by the processes disclosed which contain less than 0.25 weight percent carbon.

29 Claims, No Drawings

PROCESS FOR PREPARING CERAMIC MATERIALS WITH REDUCED CARBON LEVELS

The Government has rights in this invention pursuant to contract No. F33615-83-C-5006 awarded by the United States Air Force.

BACKGROUND OF INVENTION

This invention relates to a method of preparing ceramic materials with reduced carbon levels. More specifically this invention relates to a method of preparing ceramic materials with reduced carbon levels by pyrolyzing silicon-containing preceramic polymers in the presence of ammonia. This invention also relates to a method of preparing ceramic materials with controlled carbon levels.

Ceramic materials have been prepared from many different silicon-containing preceramic polymers. For example, polycarbosilanes, polysilazanes, polysilanes, organosilsesquioxane-containing sol-gels, and organopolysiloxanes have been used as preceramic polymers to prepare ceramic materials. The ceramic materials were prepared by heating the silicon-containing preceramic polymers to elevated temperatures under an inert atmosphere. The ceramic materials so prepared contained significant amounts of carbon. Such carbon is probably in the form of both silicon carbide and free carbon.

It would be desirable to obtain ceramic materials from silicon-containing preceramic polymers where the resulting ceramic materials contain controlled and limited amounts of carbon. It would also be desirable to obtain essentially carbon free ceramic materials from such silicon-containing preceramic polymers. It is an object of this invention to provide a method by which ceramic materials may be obtained from silicon-containing preceramic polymers where the resulting ceramic materials contain reduced but controlled amounts of carbon. It is another object of this invention to provide a method by which ceramic materials may be obtained from silicon-containing preceramic polymers where the resulting materials are essentially carbon free. Still other objects will be apparent from a consideration of this specification.

THE INVENTION

This invention relates to a process for preparing a ceramic material with reduced carbon level comprising
(A) heating a silicon-containing preceramic polymer at a temperature of about 550°-800° C. in an ammonia-containing atmosphere for a time sufficient to reduce the carbon level of the silicon-containing preceramic polymer wherein said ammonia-containing atmosphere contains 0-99 volume percent inert atmosphere and 1-100 volume percent ammonia and then
(B) heating the material formed in step (A) to a temperature of 900°-1500° C. in an inert atmosphere, vacuum, or in the presence of ammonia gas until a ceramic material with reduced carbon level is obtained.

This invention also relates to a process for preparing a ceramic material with reduced carbon levels comprising heating a silicon-containing preceramic polymer in the presence of ammonia gas in a thermally staged sequence up to and including temperatures in excess of 900° C. to obtain a ceramic material with reduced carbon levels. By "thermally staged sequence" we mean that the temperature is raised to 900° C. or above at a rate sufficiently slow to insure the desired carbon reduction.

This invention is carried out by exposing a silicon-containing preceramic polymer to an ammonia-containing atmosphere at a temperature of about 550°-800° C. for a time sufficient to reduce the carbon level of the preceramic polymer. Preferably, this invention is carried out by exposing a silicon-containing preceramic polymer to an ammonia-containing atmosphere at a temperature of about 600°-800° C. for a time sufficient to reduce the carbon level of the preceramic polymer. The reduced carbon level preceramic polymer is then converted to a ceramic material by firing the reduced carbon level preceramic polymer to elevated temperatures in an inert atmosphere or under vacuum or in the presence of ammonia gas.

The ammonia-containing atmosphere present in the 550°-800° C. range must contain at least 1 volume percent ammonia when the preceramic polymer is heated in the temperature range of 550°-800° C. The ammonia-containing atmosphere present in the 550°-800° C. range preferably contains 0-95 volume percent inert gas and 5-100 volume percent ammonia gas. The ammonia-containing atmosphere present in the 550°-800° C. range most preferably contains about 0-78 volume percent inert gas and 22-100 volume percent ammonia gas. The preceramic polymer must be exposed to the ammonia-containing atmosphere in the temperature range of 550°-800° C. Normally the preceramic polymer is heated from about room temperature to an elevated temperature of about 900°-1500° C. in order to convert the preceramic polymer to a ceramic material. At all other temperatures other than the 550°-800° C. range the preceramic polymer may or may not be exposed to an ammonia-containing atmosphere as desired. In other words, except for the 550°-800° C. temperature range, the preceramic polymer is heated to elevated temperatures under an inert gas, such as argon, nitrogen and the like, or under a vacuum or in the presence of ammonia.

Although it is necessary for the preceramic polymer to be exposed to an ammonia-containing atmosphere in the temperature range of 550°-800° C. it is not necessary for the preceramic polymer to be exposed to an ammonia-containing atmosphere during the entire period the preceramic polymer is in the 550°-800° C. range. For example, a preceramic polymer could be heated to a temperature of 600° C. under an inert atmosphere, then exposed to an ammonia-containing atmosphere for a time sufficient to reduce the carbon to the desired level at 600° C., and then continue heating to an elevated temperature under an inert atmosphere. The preceramic polymer must be exposed to an ammonia-containing atmosphere at some temperature or some shorter temperature range in the overall critical temperature range of 550°-800° C. for a time sufficient to reduce the carbon level of the preceramic polymer to the desired level. To obtain the largest reduction of carbon levels it is preferred that the preceramic polymer be exposed to an ammonia-containing atmosphere during the entire 550°-800° C. temperature range.

One object of this invention is to provide a method of controlling the carbon level of silicon-containing ceramic materials. Such control may be obtained by adjusting the pyrolysis conditions during the conversion of silicon-containing preceramic polymers into silicon-containing ceramics. The carbon level of the resulting ceramic material may be controlled by adjusting the ammonia concentration in the ammonia-containing atmosphere. Generally, the higher the ammonia concentration in the ammonia-containing atmosphere the greater reduction in carbon levels for the resulting ceramic material. The carbon level may also be controlled by varying the initial temperature at which exposure to the ammonia-containing atmosphere occurs in the 550°-800° C. temperature range. Generally, lower carbon levels in the resulting ceramic materials can be expected when the preceramic polymer is initially exposed to the ammonia-containing atmosphere at lower temperatures in the 550°-800° C. range. For example, lower carbon levels in the resulting ceramic materials would be expected from a preceramic polymer fired in an ammonia-containing atmosphere at a temperature of 550°-1000° C. as compared to a similar preceramic polymer fired in an ammonia-containing atmosphere at a temperature of 700°-1000° C. The carbon level may also be controlled by varying the time the preceramic polymer is exposed to the ammonia-containing atmosphere in the temperature range of 550°-800° C. Generally, longer exposure times result in lower carbon levels in the resulting ceramic materials. The carbon level may also be controlled by varying the percentage of time to which the preceramic polymer is exposed to the ammonia-containing atmosphere in the 550°-800° C. temperature range. Generally, the larger this percentage is the lower the carbon level of the resulting ceramic material will be. For example, a lower carbon level would be expected if the preceramic polymer is exposed to the ammonia-containing atmosphere for the entire 550°-800° C. temperature range as opposed to exposure to the ammonia-containing atmosphere only for half of the 550°-800° C. range (i.e., exposure at 550°-675° C. only).

Thus, the carbon level of the resulting ceramic material can be controlled by varying several experimental variables. It is to be expected that the lowest carbon levels can be obtained by exposing the preceramic polymer to 100 volume percent ammonia over the entire 550°-800° C. temperature range for a sufficiently long time.

The exposure time required for a given carbon reduction will vary depending on the preceramic polymer employed, the history of the preceramic polymer, and the size and shape of the preceramic polymer object. The conditions required for a given carbon reduction are best determined by routine experimentation. For example, a perceramic polymer part a few millimeters thick will require a more extensive exposure to the ammonia-containing atmosphere than will a fiber with a diameter of 10 microns to obtain the same overall carbon reduction.

It is preferred that the ammonia gas used in this invention be essentially anhydrous. By "essentially anhydrous" we mean that the ammonia gas contains less than about 100 ppm water. Ammonia containing greater than 100 ppm water can be use in this invention but the resulting ceramic materials may contain greater amounts of oxygen.

The process of this invention results in ceramic materials with reduced levels of carbon. By "reduced levels of carbon" it is meant that the ceramic materials obtained by the practice of this invention have a lower level of carbon relative to ceramic materials prepared in exactly the same manner except that the exposure to the ammonia-containing atmosphere in the 550°-800° C. range is omitted. Preferably the carbon levels are reduced by about 25 weight percent or more relative to the non-ammonia treated material. More preferably the carbon levels are reduced by about 50 weight percent or more relative to the non-ammonia treated material. For some applications it will be preferred to reduce the carbon by about 90 to almost 100 weight percent relative to the non-ammonia treated material. In absolute terms it is preferred that the resulting ceramic material contain less than 10 weight percent carbon; it is more preferred that the resulting ceramic material contain less than about 1 weight percent; and it is most preferred that the resulting ceramic material contain less than about 0.25 weight percent. Naturally, for some applications other reduced carbon levels may be preferred.

In addition to the carbon reduction noted above, an increase in the nitrogen content of the resulting ceramic material is generally observed. Additionally, the reduced carbon level ceramic materials are generally white, tan or gray. Ceramic materials which have not been exposed to an ammonia-containing atmosphere at all or which have not been exposed for a sufficient time to significantly reduce the carbon levels are generally black. It must be noted, however, that ceramic materials can be produced with reduced carbon levels by the practice of this invention which are still black. It is the reduced levels of carbon in the ceramic material which is important and not the color of the ceramic material. The color of the ceramic material can be use a simple indicator of carbon reduction in the ceramic material.

Suitable silicon-containing preceramic polymers for use in this invention include polycarbosilanes, polysilazanes, polysilanes, organosilsesquioxane-containing sol-gels, and organopolysiloxanes. The silicon-containing preceramic polymers suitable for use in this invention must be capable of being converted to a ceramic material at elevated temperatures. It is generally preferred that the preceramic polymers used in this invention be capable of being converted to a ceramic material in at least 40 weight percent yield. Mixtures of silicon-containing preceramic polymers may also be used in this invention. By mixtures we mean both physical mixtures of the various preceramic polymers and preceramic polymers with more than one structural unit therein. Thus a preceramic polymer containing both polycarbosilane and organopolysiloxane units would be useful in this invention.

Examples of suitable polycarbosilanes for use in this invention include polycarbosilanes as described by Yajima et al. in U.S. Pat. Nos. 4,052,430 (issued Oct. 4, 1977), 4,100,430 (issued July 11, 1978), 4,159,259 (issued June 26, 1979), 4,220,600 (issued Sept. 2, 1980), 4,283,376 (issued Aug. 11, 1981), 4,336,215 (issued June 22, 1982), 4,342,712 (issued Aug. 3, 1982), 4,347,347 (issued Aug. 31, 1982), 4,358,576 (issued Nov. 9, 1982), 4,359,559 (issued Nov. 16, 1982), 4,399,232 (issued Aug. 16, 1983), and 4,455,414 (issued June 19, 1984), all of which are hereby incorporated by reference. Other polycarbosilanes suitable for use in this invention include polycarbosilanes prepared by the method of Iwai et al. in U.S. Pat. No. 4,377,677 (issued Mar. 22, 1983), branched polycarbosilanes as described by Schilling, Jr. et al. in U.S. Pat. No. 4,414,403 (issued Nov. 8, 1983), and the polycarbosilanes described in British Pat. No. 2,106,528, all of which are hereby incorporated by reference. The polycarbosilanes described by Bujalski in U.S. patent application Ser. No. 678,122 (filed Dec. 4, 1984), which is hereby incorporated by reference, may also be use in this invention. Still other polycarbosilanes may also be suitable for use in this invention.

Examples of polysilazanes suitable for use in this invention include polysilazanes as described by Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983), all of which are hereby incorporated by reference. Suitable polysilazanes also include those described by Haluska in U.S. Pat. No. 4,482,689 (issued Nov. 13, 1984) and by Seyferth et al. in U.S. Pat. No. 4,397,828 (issued Aug. 9, 1983), both of which are hereby incorporated by reference. Other polysilazanes suitable for use in this invention are disclosed by Cannady in U.S. patent applications Ser. Nos. 555,755 (filed Nov. 28, 1983), 627,260 (filed July 2, 1984), and 689,258 (filed Jan. 7, 1985), by Bujalski in U.S. patent application Ser. No. 653,003 (filed Sept. 21, 1984), and by Baney et al. in U.S. patent application Ser. Nos. 652,938 (filed Sept. 21, 1984) and 653,939 (filed Sept. 21, 1984), all of which are hereby incorporated by reference. Still other polysilazanes may be suitable for use in this invention.

Examples of polysilanes suitable for use in this invention include polysilanes as described by Baney et al. in U.S. Pat. Nos. 4,298,558 (issued Nov. 3, 1981), 4,298,559 (issued Nov. 3, 1981), 4,310,651 (issued Jan. 12, 1982), 4,314,956 (issued Feb. 9, 1982), and Re. 31,447 (issued Nov. 22, 1983), all of which are hereby incorporated by reference. Other suitable polysilanes are described by Baney in U.S. Pat. Nos. 4,310,481 (issued Jan. 12, 1982) and 4,310,482 (issued Jan. 12, 1982), and by Haluska in U.S. patent application Ser. No. 647,329 (filed Sept. 4, 1984), all of which are hereby incorporated by reference. Still other polysilanes may be useful in the practice of this invention.

Examples of suitable organosilsesquioxane-containing sol-gels which are useful in this invention include organosilsesquioxane-containing sol-gels as described by January in U.S. Pat. No. 4,472,510 (issued Sept. 18, 1984), which is hereby incorporated by reference. Still other organosilsesquioxane-containing sol-gels may be useful in this invention.

Examples of suitable organopolysiloxanes which are useful in this invention include organopolysiloxanes containing boron as described by Yajima et al. in U.S. Pat. No. 4,152,509 (issued May 1, 1979), which is hereby incorporated by reference. Still other polyorganosiloxanes may be useful in this invention.

Preferred silicon-containing preceramic polymers include the polycarbosilanes and the polysilazanes.

The polycarbosilanes suitable for use in this present invention contain Si and C as the main skeleton elements in the form of —(—SiCH2—)—units. The polycarbosilanes useful in this invention may also contain oxygen as a skeleton element in addition to Si and C as the main skeleton elements. Oxygen may be introduced during preparation or handling or may be incorporated into the polycarbosilane by design. It is preferred that the amount of oxygen present is less than about 10 weight percent, more preferably less than about 5 weight percent, and most preferably less than 1 weight percent. Other elements may also be present as main skeleton elements in addition to Si, C, and O. However, these other elements should be present at less than about 1 weight percent and preferably only be present at trace levels (i.e. less than 0.1 weight percent). Suitable polycarbosilanes may be prepared by methods well known in the art.

Preferred polycarbosilanes can be prepared from the thermal polycondensation of polysilanes as described in U.S. Pat. Nos. 4,052,430 and 4,100,233, which have been incorporated by reference.

More preferred polycarbosilanes can be prepared by thermally decomposing and polycondensing a polysilane or polysilanes by heating said polysilane or polysilanes at a temperature of 300°–700° C. in an inert gas, hydrogen, or vacuum wherein said polysilane or polysilanes are selected from the group consisting of cyclic polysilanes of the general formula $(R^1R^2Si)_n$ and linear polysilanes of the general formula

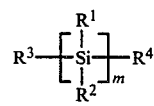

where n is greater than or equal to 4; where m is greater than or equal to 2; and where $R^1$, $R^2$, $R^3$, and $R^4$ are independently selected from the group consisting of hydrogen, alkyl groups containing 1 to 4 carbon atoms, phenyl, —Si($R^5$)$_3$ groups where $R^5$ is a alkyl group containing 1 to 4 carbon atoms, and halogen atoms. Examples of $R^1$, $R^2$, $R^3$, and $R^4$ as alkyl groups and $R^5$ include methyl, ethyl, propyl and butyl groups. Examples of $R^1$, $R^2$, $R^3$, and $R^4$ as halogens include chlorine and bromine with chlorine being preferred. The most preferred polycarbosilanes are prepared by the thermal decomposition and polycondensation of dodecamethylcyclohexasilane or polydimethylsilane.

Polysilazanes suitable for use in the present invention include $R_3$SiNH-containing silazane polymers. $R_3$SiNH-containing silazane polymers especially useful in this invention are described in U.S. Pat. Nos. 4,312,970 and 4,340,619 and U.S. patent application Ser. No. 555,755 filed Nov. 28, 1983, all of which have been incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula $R'_cSiCl_{(4-c)}$ with a disilazane having the general formula $(R_3Si)_2NH$ at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

The organochloromonosilanes of U.S. Pat. No. 4,312,970 are those having the general formula $R'_cSiCl_{(4-c)}$ where R' is vinyl or an alkyl radical containing 1–3 carbon atoms or the phenyl group. Thus, those groups which are contemplated as being useful in this invention are methyl, ethyl, propyl, vinyl, and phenyl. The R' groups can all be the same or they can be different. The organochloromonosilanes are common commodity chemicals and are commercially available and, therefore, an explanation as to their preparation does not appear to be necessary. The value of c is 1 or 2. Thus, single organic group substituted silanes such as $CH_3SiCl_3$, $C_6H_5SiCl_3$, $CH_2=CHSiCl_3$, $CH_3CH_2SiCl_3$ or $CH_3(CH_2)_2SiCl_3$ and double organic substituted silanes such as $(CH_3)_2SiCl_2$, $(C_2H_5)_2SiCl_2$ and $(CH_2=CH)(CH_3)SiCl_2$. Mixtures of such silanes, for example $CH_3SiCl_3$ and $(CH_3)_2SiCl_2$, can be used. It is preferred that when organochlorosilane mixtures are used, the number of units of diorgano-substituted silicon atoms should not exceed the number of units of monoorgano-substituted silicon atoms.

The silazane polymers of U.S. Pat. No. 4,340,619 are prepared by contacting and reacting in an inert, essentially anhydrous, atmosphere, a chlorine-containing disilane or a mixture of chlorine-containing disilanes, of the general formula $$(Cl_dR'_eSi)_2$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5–3; e has a value of 0–2.5 and the sum of (d+e) is equal to three.

The chlorine-containing disilanes of U.S Pat. No. 4,340,619 are those disilanes having the general formula $$(Cl_dR'_eSi)_2$$

where R' is vinyl, an alkyl radical containing 1–3 carbon atoms or the phenyl group. Thus, the R' groups can all be the same or they can be different. The chlorine-containing disilanes can be those found in the residue from the Direct Process for producting halosilanes (Eaborn, C, "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes. For the chlorine-containing disilanes described above, the value of d and e is from 0.5–3 and 0–2.5 respectively, and the sum of (d+e) is equal to three. Examples of chlorine-containing disilanes are $[Cl(CH_3)_2Si]_2$, $[Cl_2CH_3Si]_2$, $[Cl_2C_2H_5Si]_2$, $[Cl(C_6H_5)_2Si]_2$ and $[Cl_2CH_2=CHSi]_2$. Monosilanes can also be used in admixtures with the above described chlorine-containing disilanes. Examples include $CH_3SiCl_3$, $(CH_3)_2SiCl_2$, $H(CH_3)_2SiCl$, $(CH_3)_3SiCl$, $(CH_2=CH)(CH_3)_2SiCl$, $(C_2H_5)_2SiCl_2$, $C_6H_5SiCl_3$, as well as $(C_6H_5)_2SiCl_2$, and $(C_6H_5)_3SiCl$. When polysilazane polymers are prepared in accordance with U.S. Pat. No. 4,340,619 for use in this invention it is preferred that mixtures of chlorine-containing disilanes to employed where the number of units of diorgano-substituted silicon atoms does not exceed the number of units of monoorgano-substituted silicon atoms.

The silazane polymers of application Ser. No. 555,755 are prepared by contacting and reacting in an inert, essentially anhydrous atmosphere, trichlorosilane with a disilazane at a temperature in the range of 25° C. to 300° C. while removing byproduced volatile products, wherein said disilazane has the general formula $$(R_3Si)_2NH$$

where R is selected from the group consisting of vinyl, hydrogen, phenyl, and alkyl radicals containing 1 to 3 carbon atoms. It appears that some component, possibly a hydrolysis product, in aged trichlorosilane is detrimental in the preparation of this $R_3SiNH$-containing silazane polymer. Such contaminated trichlorosilanes can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. Nos. 4,312,970, 4,340,619, and application Ser. No. 555,755 is a disilazane of the general formula $(R_3Si)_2NH$. R in this formula is vinyl, hydrogen, an alkyl radical of 1–3 carbon atoms or the phenyl group. Therefore, R, for purposes of this formula, is represented by hydrogen, methyl, ethyl, propyl, vinyl and phenyl. Each R group in this formula can be the same or they can be different. Examples of the disilazanes include:
$[(CH_3)_3Si]_2NH$, $[C_6H_5(CH_3)_2Si]_2NH$,
$[(C_6H_5)_2CH_3Si]_2NH$, $[CH_2=CH(CH_3)_2Si]_2NH$,
$[CH_2=CH(CH_3)C_6H_5Si]_2NH$,
$[CH_2=CH(C_6H_5Si]_2NH$,
$[CH_2=CH(C_2H_5)_2Si]_2NH$, $[CH_2=CH(CH_3)_2Si]_2NH$ and
$[CH_2=CH(C_6H_5)C_2H_5Si]_2NH$.

The reactants, as described in U.S. Pat. Nos. 4,312,970 and 4,340,619 and application Ser. No. 555,755, are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619 and application Ser. No. 555,755, the reaction begins which forms an intermediate amino compound. Upon heating, additional amino compound is formed and upon continued heating, $R_3SiCl$ is distilled from the reaction mixture and a silazane polymer is formed. The order of addition of the materials does not appear to be critical. As the temperature is raised higher, more condensation takes place and crosslinking occurs with residual $R_3Si$— that is not distilled from the mixture acting as a chain stopper. This control allows one to stop the reaction at any point to obtain almost any desired viscosity.

The desirable temperature range for this reaction is 25° C. to 300° C. A preferred temperature range for this reaction is 125° C.–300° C. The length of time that the reaction requires depends on the temperature employed and the viscosity one wishes to achieve. What is meant by "volatile products" are the distillable byproduced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$ and $(CH_2=CH)(CH_3)_2SiCl$. Sometimes, the process requires the use of a vacuum along with heat in order to remove these materials from the reaction mixture.

Preferably the preceramic polymers used in the practice of this invention have a softening point of about 50° to 300° C. and most preferably in the range of 70° to 200° C. Such a softening point allows for the formation of preceramic fibers by known spinning techniques.

After the preceramic polymer has been treated with ammonia, the treated preceramic polymer is fired to an elevated temperature of at least 900° C. until the mixture is converted to a ceramic material. If the preceramic polymer is of sufficient viscosity or if it possesses a sufficiently low melt temperature, it can be shaped first, then treated with ammonia at 600°–800° C., and then finally pyrolyzed to give a reduced carbon ceramic shaped article such as a fiber.

It is generally preferred, however, that the preceramic article be rendered infusible prior to being either exposed to ammonia or being fired to elevated temperatures. Articles that have not been rendered infusible prior to pyrolysis are likely to melt and, perhaps, fuse together during the pyrolysis. The preceramic polymers can be cured (i.e. rendered infusible) by treatment with air or air containing water vapor at relatively low temperatures. The $R_3SiNH$-containing polysilazanes can also be cured by treatment at relatively low temperatures with a reactive metal halide of general formula $MX_n$ or $R_bSiX_{(4-b)}$ at a temperature below the softening point of the $R_3SiNH$-containing silazane polymer for a time sufficient to render the silazane polymer infusible where R is selected from the group consisting of vinyl, hydrogen, phenyl, and alkyl radicals containing 1 to 3 carbon atoms; M is a metal atom of valence n; X is a halide atom selected from the group consisting of chlorine and bromine; and b has a value of 0, 1, or 2; where said reactive metal halide has fewer carbon atoms than the $R_3SiNH$-endblocking group; and where said reactive metal halide has at least two halide atoms. Suitable reactive metal halides of the formula $MX_n$ include $BCl_3$, $BBr_3$, $PCl_3$, $PBr_3$, $ZrCl_4$, and $SnCl_4$. Suitable reactive metal halides of the formula $R_bSiX_{(4-b)}$ include $HSiCl_3$, $SiCl_4$, $CH_3SiCl_3$, $CH_3CH_2SiCl_3$, $C_6H_5SiCl_3$, $CH_2=CHSiCl_3$, $(CH_3)_2SiCl_2$, and the like. Preferred reactive metal halides include $HSiCl_3$ and $SiCl_4$. Mixtures of various reactive metal halides may also be used. By "relatively low temperatures" we mean temperatures below the softening point of the preceramic polymer. Typically, the preceramic shaped articles are rendered infusible by treatment at temperatures in the range of room temperature to about 175° C.

The preceramic polymer can be filled with ceramic type fillers (if desired) and then treated with ammonia and fired to at least 900° C. to obtain reduced carbon containing ceramic materials or reduced carbon containing ceramic articles.

The preceramic polymers can be used in both the filled and unfilled state, depending on the application. Thus, it is contemplated within the scope of this invention to coat substrates with filled and unfilled preceramic polymers, treat the coated articles with ammonia and then heat the substrates to produce ceramic coated articles. Fillers and adjuvants can be milled on 3 roll mills by simply mixing the preceramic polymers with the fillers and making several passes on the mill. In the alternative, the preceramic polymers can be placed in solvents and the fillers and adjuvants can be added thereto and, after mixing, the solvent can be removed to give the filled mixture. The coating can be carried out by conventional means. The means used depends on the mixture and substrates used and the application one has in mind. Thus, these materials can be brushed, rolled, dipped or sprayed. In the filled state, it is sometimes necessary to trowel the mixture onto the substrate. The preceramic polymers may also be used as an infiltrant with ceramic materials or as a matrix material for composites. Other uses will be apparent to those skilled in the art from a consideration of this specification.

So that those skilled in the art can better appreciate and understand the invention, the following examples are given. Unless otherwise indicated, all percentages are by weight.

In the following examples, the analytical methods used were as follows:

Carbon and nitrogen were determined on a C, H, N Elemental Analyzer, Model 1106, manufactured by Carlo Erba Strumentazione of Italy. The sample was combusted at 1030° C. and then passed over a chromium oxide bed at 650° C. and a copper bed at 650° C. The $N_2$ and $CO_2$ produced were then separated and detected using a thermal conductivity detector.

The penetration temperature was measured with a DuPont Instruments Thermoanalyzer Model 1090 equipped with a Model 1091 DuPont Disk Memory and a DuPont Model 943 Thermomechanical Analyzer. The penetration temperature is related to the softening point.

The tensile strength and elastic modulus were determined on a single filament employing a computer controlled Instron tester Model 1122 equipped with pneumatic jaws and a 500 g load cell. The procedure used was similar to ASTM 3379-75.

EXAMPLE 1

A preceramic polymer was prepared using the procedure outlined in U.S. Pat. No. 4,340,619. A mixture of disilanes obtained from the direct process was reacted with hexamethyldisilazane. The mixture of disilanes contained 58.2 weight percent $Cl_2CH_3SiSiCH_3Cl_2$, 32.5 weight percent $Cl_2CH_3SiSi(CH_3)_2Cl$, 7.9 weight percent $Cl(CH_3)_2SiSi(CH_3)_2Cl$, and 1.2 weight percent low boiling impurities. The hexamethyldisilazane was added to the disilane mixture at a level equivalent to 0.75 moles of hexamethyldisilazane per mole of Si-Cl present in the disilane mixture. The resulting mixture was heated to 75° C. and held for 15 minutes. The temperature was then raised to 190° C. at a rate of 1.1° C./min. All reaction steps were carried out under an argon atmosphere. Volatiles were removed by distillation throughout the heating process. The resulting silazane polymer had a penetration temperature of about 86° C.

The preceramic polymer was first passed through a filter consisting of 20 ml of 50–70 mesh classified sand, 10 ml of 80–100 mesh classified sand and a 125 mesh screen. Fibers were prepared from the filtered preceramic polymer by extrusion through a spinneret containing twenty-six holes of 0.01 inch diameter each at a temperature of 138° C. Fibers of an average diameter of 50 microns were obtained. The fibers were cured at 65° C. in humidified air (100 percent relative humidity at room temperature) for 17 hours by passage of the humidified air over the fibers at a rate of about 8 cubic feet per hour (cfh). The cured fibers were insoluble in toluene.

The cured fibers were then fired to 1200° C. under varying atmospheric conditions. Fiber samples (about 0.1–0.2 grams) were placed in a 2 inch diameter by 36 inch long alumina tube in an Astro Industries Model A744 tube furnace. Both ends of the tube were sealed. The tube was then evacuated and refilled with argon twice to remove air from the system. The atmosphere of the desired composition was then passed through the tube at a rate of 1200 cc/min. Once the flow of gas started the fiber sample was heated to 1200° C. at a rate of 3 C/min. Once the sample reached 1200° C. the furnace was turned off and the sample allowed to cool. The ammonia gas flow remained on until the sample had cooled to 800° C. Argon gas was used as the diluent. The results are presented in Table I. The experiment containing zero ammonia is presented for comparative purposes only.

TABLE I

| NH₃ VOL % | CERAMIC YIELD, % | CHAR COLOR | TENSILE STRENGTH (MPa) | ELASTIC MODULUS (GPa) | NITROGEN (wt %) | CARBON (wt %) |
|---|---|---|---|---|---|---|
| 0 | 57.2 | black | 725 | 130 | 9.28 | 21.0 |
| 2.5 | 53.9 | tan/black | — | — | 27.7 | 2.25 |
| 5 | 53.7 | white | 320 | 97 | 27.3 | 0.7 |
| 22 | 45.9 | white | — | — | 26.0 | 0.1 |
| 100 | 43.5 | white | low | — | 19.3 | <0.05 |

The resulting ceramic fibers, in all cases, did not fuse together during the firing. The resulting ceramic fibers had densities of about 2.3–2.4 g/cm³.

This example clearly shows that exposure of this preceramic fiber to ammonia during firing results in a ceramic with significantly reduced carbon levels and with significantly increased nitrogen levels. The amount of carbon reduction in the resulting ceramic depends, at least in part, on the ammonia concentration during the firing process. Exposure of this preceramic fiber to an atmosphere containing at least 2.5 volume percent ammonia results in ceramic materials with significantly reduced carbon levels.

EXAMPLE 2.

The same cured, preceramic polymer fibers as described in Example 1 were employed in this example. The firing procedure was similar to that used in Example 1 except that 22 volume percent ammonia in argon was employed in all cases and that the ammonia-containing atmosphere was replaced at varying temperatures in the firing process with pure argon. The firing was continued to 1200° C. using the argon atmosphere. The results are presented in Table II. The "NH₃ CUT-OFF TEMP, °C." in Table II is the temperature at which the ammonia treatment was stopped and replaced with an argon atmosphere.

TABLE II

| NH₃ CUT-OFF TEMP, °C. | CERAMIC YIELD, % | CHAR COLOR | TENSILE STRENGTH (MPa) | ELASTIC MODULUS (GPa) | NITROGEN (wt %) | CARBON (wt %) |
|---|---|---|---|---|---|---|
| 600 | 46.0 | black | 560 | 170 | 19.6 | 11.6 |
| 700 | 49.0 | white | 145 | 84 | 25.4 | 0.16 |
| 800 | 46.4 | tan | — | — | 24.0 | <0.05 |
| 1200 | 45.9 | white | — | — | 26.0 | ~0.1 |

The resulting ceramic fibers, in all cases, did not fuse together during the firing. The resulting ceramic fibers had densities of about 2.3 g/cm³.

This example shows that a reduction of carbon can be obtained in the resulting ceramic material if the ammonia-containing atmosphere is present when the firing temperature is above 600° C. If the ammonia-containing atmosphere is only present at temperatures significantly less than 600° C. during the firing process then little carbon reduction can be expected with this type of preceramic polymer under the experimental conditions of this experiment. It is expected, however, that carbon reduction could be obtained at temperatures of about 550°–600° C. if the exposure time of the preceramic polymer to the ammonia-containing atmosphere was increased.

EXAMPLE 3

The same cured, preceramic polymer fibers as described in Example 1 were employed in this example. The firing procedure was similar to that used in Example 1 except that 22 volume percent ammonia in argon was employed in all cases and that the ammonia-containing atmosphere was started at varying temperatures in the firing process. The firing process was started with an argon atmosphere. At a given temperature the argon was replaced with a 22 volume percent ammonia atmosphere and the heating continued to 1200° C. The results are presented in Table III. The experiment containing zero ammonia is presented for comparative purposes only. The "NH₃ START-UP TEMP, °C." in Table III is the temperature at which the argon purge was terminated and replaced with the ammonia-containing atmosphere.

TABLE III

| NH₃ START-UP TEMP, °C. | CERAMIC YIELD, % | CHAR COLOR | NITROGEN (wt %) | CARBON (wt %) |
|---|---|---|---|---|
| 25 | 45.9 | white | 26.0 | ~0.1 |
| 600 | 56.7 | white | 27.4 | ~0.1 |
| 700 | 60.8 | black | 22.2 | 1.4 |
| * | 57.2 | black | 9.28 | 21.0 |

*No ammonia was present at any time.

The resulting ceramic fibers, in all cases, did not fuse together during the firing. The resulting ceramic fibers had densities of about 2.3-2.4 g/cm³.

This example shows that a reduction of carbon can be obtained in the resulting ceramic material if the ammonia-containing atmosphere is present when the firing temperature is below about 700° C. If the ammonia-containing atmosphere is only present at temperatures significantly greater than 700° C. during the firing process then little carbon reduction can be expected with this type of preceramic polymer.

EXAMPLE 4

Another preceramic polymer was prepared using the procedure outlined in U.S. Pat. No. 4,340,619. A mixture of disilanes obtained from the direct process and phenylvinyldichlorosilane was reacted with hexamethyldisilazane. The mixture of disilanes contained 58.09 weight percent $Cl_2CH_3SiSiCH_3Cl_2$, 33.4 weight percent $Cl_2CH_3SiSi(CH_3)_2Cl$, 7.6 weight percent $Cl(CH_3)_2SiSi(CH_3)_2Cl$, and 0.8 weight percent low boiling impurities. Phenylvinyldichlorosilane was added to the disilane mixture at a level of 0.2 moles per mole of disilane. The hexamethyldisilazane was added to the disilane mixture at a level equivalent to 0.75 moles of hexamethyldisilazane per mole of Si-Cl present in the disilane mixture. The resulting mixture was heated to 75° C. and held for 15 minutes. The temperature was then raised to 230° C. at a rate of 1.1° C./min. All reaction steps were carried out under an argon atmosphere. Volatiles were removed by distillation throughout the heating process. The resulting silazane polymer had a softening point of about 70° C.

Fibers were obtained using the same procedure of Example 1 except that a spinning temperature of 144° C. was employed. The fibers has a average diameter of 40 microns. The fibers were cured as in Example 1. The cured fibers were insoluble in toluene.

The cured fibers were then fired to 1200 C. under varying atmospheric conditions as described in Example 1. The results are presented in Table IV. The experiment containing zero ammonia is presented for comparative purposes only.

TABLE IV

| $NH_3$ VOL % | CERAMIC YIELD, % | CHAR COLOR | TENSILE STRENGTH (MPa) | ELASTIC MODULUS (GPa) | NITROGEN (wt %) | CARBON (wt %) |
|---|---|---|---|---|---|---|
| 0 | 74.3 | black | 680 | 185 | 8.96 | 29.8 |
| 5 | 65.5 | black | 385 | 110 | 20.0 | 4.6 |
| 22 | 54.4 | tan | low | — | 26.8 | 0.1 |
| 100 | 55.2 | white | low | — | 13.9 | <0.05 |

The resulting ceramic fibers, in all cases, did not fuse together during the firing. The resulting ceramic fibers had densities of about 2.2-2.3 g/cm³.

This example clearly shows that exposure of this preceramic fiber to ammonia during firing results in a ceramic with significantly reduced carbon levels and with significantly increased nitrogen levels. The amount of carbon reduction in the resulting ceramic depends, at least in part, on the ammonia concentration during the firing process. Exposure of this preceramic fiber to an atmosphere containing at least 5.0 volume percent ammonia results in ceramic materials with significantly reduced carbon levels.

EXAMPLE 5

The same cured, preceramic polymer fibers as described in Example 4 were employed in this example. The firing procedure was similar to that used in Example 4 except that 22 volume percent ammonia in argon was employed in all cases and that the ammonia-containing atmosphere was replaced at varying temperatures in the firing process and replaced with pure argon. The firing was continued to 1200° C. using the argon atmosphere. The results are presented in Table V.

TABLE V

| $NH_3$ CUT-OFF TEMP, °C. | CERAMIC YIELD, % | CHAR COLOR | TENSILE STRENGTH (MPa) | ELASTIC MODULUS (GPa) | NITROGEN (wt %) | CARBON (wt %) |
|---|---|---|---|---|---|---|
| 600 | 61.7 | black | — | — | 18.6 | 21.5 |
| 700 | 59.0 | black | 625 | 140 | 27.3 | 10.8 |
| 800 | 56.2 | black | — | — | 27.6 | 3.91 |
| 1200 | 54.4 | tan | — | — | 26.8 | ~0.1 |

The resulting ceramic fibers, in all cases, did not fuse together during the firing. The resulting ceramic fibers had densities of about 2.2-2.3 g/cm³.

This example shows that a reduction of carbon can be obtained in the resulting ceramic material if the ammonia-containing atmosphere is present when the firing temperature is above about 600° C. for this particular preceramic polymer. If the ammonia-containing atmosphere is only present at temperatures of less than 600° C. during the firing process under the experimental conditions of this example, then little carbon reduction can be expected with this type of preceramic polymer. It is expected, however, that carbon reduction could be obtained at temperatures of about 550°-700° C. if the exposure time of the preceramic polymer to the ammonia-containing atmosphere was increased.

EXAMPLE 6

The same cured, preceramic polymer fibers as described in Example 4 were employed in this example. The firing procedure was similar to that used in Example 4 except that 22 volume percent ammonia in argon was employed in all cases and that the ammonia-containing atmosphere was started at varying temperatures in the firing process. The firing process was started with an argon atmosphere. At a given temperature the argon was replaced with a 22 volume percent ammonia atmosphere and the heating continued to 1200° C. The results are presented in Table VI. The experiment containing zero ammonia is presented for comparative purposes only.

TABLE VI

| NH$_3$ START-UP TEMP, °C. | CERAMIC YIELD, % | CHAR COLOR | TENSILE STRENGTH (MPa) | ELASTIC MODULUS (GPa) | NITROGEN (wt %) | CARBON (wt %) |
| --- | --- | --- | --- | --- | --- | --- |
| 25 | 54.4 | white | — | — | 26.8 | ~0.1 |
| 600 | 63.9 | off-white | 415 | 100 | 26.1 | ~0.05 |
| 700 | 72.8 | black | 890 | 144 | 15.6 | 21.2 |
| * | 74.3 | black | 680 | 185 | 8.96 | 29.8 |

*No ammonia was present at any time.

The resulting ceramic fibers, in all cases, did not fuse together during the firing. The resulting ceramic fibers had densities of about 2.2–2.3 g/cm$^3$.

This example shows that a reduction of carbon can be obtained in the resulting ceramic material if the ammonia-containing atmosphere is present when the firing temperature is below about 700° C. If the ammonia-containing atmosphere is only present at temperatures of greater than 700° C. during the firing process then little carbon reduction can be expected with this type of preceramic polymer with these particular experimental conditions.

EXAMPLE 7

Another polysilazane preceramic polymer was prepared using the procedures outlined in U.S. patent application Ser. No. 555,755 (filed Nov. 28, 1983). The preceramic polymer was prepared by mixing one equivalent trichlorosilane with 2.25 equivalents of hexamethyldislazane at 0°–15° C. The mixture was held at room temperature overnight and then heated at a rate of 1° C./min to 250° C. The reaction mixture was held at 250° C. for one hour. All reaction steps were carried out under an argon atmosphere. During the heating period, volatiles were removed by distillation. The preceramic polymer was cooled, dissolved in toluene, filtered through a 0.45 micron membrane, and then strip distilled at 250° C. under vacuum in a molecular still. The resulting preceramic polymer had a penetration temperature of 76° C. The preceramic polymer was spun into fibers using a melt rheometer with a single 0.02 inch orifice at a temperature of 154° C. The preceramic fibers had diameters of 40–50 microns.

One sample of these preceramic fibers were fired in a 100 volume percent ammonia atmosphere as in Example I. The fibers were not cured prior to the ammonia pyrolysis. After the pyrolysis to 1200° C. the fiber had melted and fused together.

Another sample of these preceramic fibers was cured by exposure to humidified air. The fiber were exposed to humidified air (about 8 cfh flow and 100 percent relative humidity at room temperature) where the temperature was raised from 35° to 165° C. at a rate of 2.7° C./hr.

Still another sample of these preceramic fibers was cured by exposure to trichlorosilane. The fiber were heated to 60° C. in a glass tube. Argon was bubbled through trichlorosilane at 0° C. and then passed over the fibers at a rate of 200 ml/min for five minutes. The fibers were then purged with pure argon for an additional five minutes. Finally the fibers were vacuum stripped at about 5 mmHg for ten minutes before cooling to room temperature.

The various samples of preceramic fiber were then exposed to a 100 volume percent ammonia atmosphere using the same procedure as used in Example 1. The results are given in Table VII.

TABLE VII

| CURE | CERAMIC YIELD, % | CHAR COLOR | TENSILE STRENGTH (MPa) | ELASTIC MODULUS (GPa) | NITROGEN (wt %) | CARBON (wt %) |
| --- | --- | --- | --- | --- | --- | --- |
| none | 50.7 | white | — | — | — | — |
| air | 63.6 | white | 26 | 6.9 | 31.4 | ~0.1 |
| HSiCl$_3$ | 61.8 | white | — | — | — | — |

Samples with no cure melted and fused during pyrolysis to 1200° C. Cured fibers did not melt or fuse when pyrolyzed to 1200° C. Samples of this preceramic material give a black colored ceramic in about 60 weight percent yield with a carbon content of about 10–12 weight percent when fired to elevated temperatures in an ammonia-free argon atmosphere. It is clear based on the char color and the analytical data that exposure of this preceramic polymer to ammonia during pyrolysis results in significant carbon reduction in the ceramic product.

EXAMPLE 8

The polycarbosilane employed in this example was obtained from Nippon Carbon Co., Ltd., 2-6-1, Hachi-Chobari, Chuo-Ku, Tokyo 104, Japan and is thought to be prepared by the method described in U.S. Pat. Nos. 4,052,430 and 4,100,233. The polycarbosilane was yellow in appearance and was soluble in toluene, xylene, n-hexane, n-heptane, and tetrahydrofuran and was insoluble in methanol and water. IR analysis indicated absorptions at 740 and 830 cm$^{-1}$ (SiCH$_3$), 1020 and 1355 cm$^{-1}$ (SiCH$_2$Si), 2095 cm$^{-1}$ (SiH), 1255, 1400, 2900, and 2960 cm$^{-1}$ (CH$_3$). The polycarbosilane had a penetration temperature of about 160° C.

Fibers from this preceramic polymer were prepared using two different methods. Multifilament fibers was prepared by extruding the polymer through a 20 micron filter and then through a spinneret having twenty six 0.01 inch holes at a temperature of 260° C. The average fiber diameter was about 20 microns. Monofilament fibers were prepared by extruding the polymer through a single 0.02 inch diameter orifice at 270° C. The monofilament fibers had an average fiber diameter of about 30 microns.

Fibers of this polycarbosilane preceramic polymer were cured in humidified air (100 percent relative humidity at room temperature) at 150° C. for 4 hours. The cured fibers were then fired in 100 volume percent ammonia to 1200° C. using the same procedure as given in Example 1. The results are given in Table VIII. The experiment containing zero ammonia is presented for comparative purposes only.

TABLE VII

| NH₃ VOL % | CERAMIC YIELD, % | CHAR COLOR | TENSILE STRENGTH (MPa) | ELASTIC MODULUS (GPa) | CARBON (wt %) |
|---|---|---|---|---|---|
| 0* | 82.7 | black | 1180 | 210 | 36.2 |
| 100* | 72.1 | white | 330 | 110 | — |
| 100** | 70.4 | white | 180 | 67 | ~0.1 |

*Multifilament fiber.
**Monofilament fiber.

The fibers did not melt or fuse together during the pyrolysis. The resulting ceramic fibers had densities in the range of 2.3–2.5 g/cm³. It is clear, based on the color of the resulting char and the analytical data, that exposure of polycarbosilane preceramic fibers to an ammonia atmosphere during pyrolysis results in a ceramic material with reduced carbon levels.

EXAMPLE 9

An organsilsesquioxane-containing sol-gel was employed as the preceramic polymer in this example. A sol-gel containing 55 weight percent CH₃SiO₃/₂ units and 45 weight percent SiO₂ units at a pH of 7 was prepared using the procedures outlined in U.S Pat. No. 4,472,510. Samples of the sol-gel were placed in a crucible in such a manner as to allow the maximum exposure of the sol-gel to the atmosphere during pyrolysis. Pyrolysis was carried out in a Lindberg tube furnace. After purging the system with argon, a 100 volume percent ammonia flow was begun. After approximately 20 minutes the ammonia pyrolysis was started using the following temperature program: 25° to 200° C. at a rate of about 14.5 ° C./min; 200° to 600° C. at about 3.3° C./min; 600° to 750° C. at about 2.5° C./min; 750° to 1200° C. at about 7.5° C./min; hold at 1200° C. for 30 minutes; and then cool to room temperature. The purging gas was switched to argon during the cool down period. The resulting ceramic material was white. Analysis indicated a carbon content of about 0.024 weight percent and a nitrogen content of about 10.0 weight percent. Ceramic materials prepared from similar sol-gel preceramic polymers without exposure to ammonia, as detailed in U.S. Pat. No. 4,472,510, were black in color and had significant carbon content and undetected nitrogen content.

That which is claimed is:

1. A process for preparing a ceramic material with reduced carbon level comprising
  (A) heating a silicon-containing preceramic polymer at a temperature of about 550°–800° C. in an ammonia-containing atmosphere for a time sufficient to reduce the carbon level of the silicon-containing preceramic polymer wherein said ammonia-containing atmosphere contains 0–99 volume percent inert atmosphere and 1–100 volume percent ammonia and then
  (B) heating the material formed in step (A) to a temperature of 900–1500° C. in an inert atmosphere, vacuum, or in the presence of ammonia gas until a ceramic material with reduced carbon level is obtained.

2. A process as defined in claim 1 wherein said ammonia-containing atmosphere contains 0–78 volume percent inert gas and 22–100 volume percent ammonia.

3. A process as defined in claim 1 wherein said silicon-containing preceramic polymer is a polycarbosilane.

4. A process as defined in claim 2 wherein said silicon-containing preceramic polymer is a polycarbosilane.

5. A process as defined in claim 3 wherein said polycarbosilane is prepared by thermally decomposing and polycondensing a polysilane or polysilanes by heating said polysilane or polysilanes at a temperature of 300°–700° C. in an inert gas, hydrogen, or vacuum wherein said polysilane or polysilanes are selected from the group consisting of cyclic polysilanes of the general formula

(R¹R²Si)ₙ and linear polysilanes of the general formula

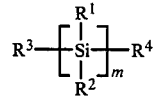

where n is greater than or equal to 4; where m is greater than or equal to 2; and where R¹, R², R³, and R⁴ are independently selected from the group consisting of hydrogen, alkyl groups containing 1 to 4 carbon atoms, phenyl, —Si(R⁵)₃ groups where R⁵ is a alkyl group containing 1 to 4 carbon atoms, and halogen atoms.

6. A process as defined in claim 4 wherein said polycarbosilane is prepared by thermally decomposing and polycondensing a polysilane or polysilanes by heating said polysilane or polysilanes at a temperature of 300°–700° C. in an inert gas, hydrogen, or vacuum wherein said polysilane or polysilanes are selected from the group consisting of cyclic polysilanes of the general formula

(R¹R²Si)ₙ and linear polysilanes of the general formula

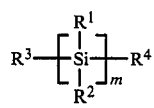

where n is greater than or equal to 4; where m is greater than or equal to 2; and where R¹, R², R³, and R⁴ are independently selected from the group consisting of hydrogen, alkyl groups containing 1 to 4 carbon atoms, phenyl, —Si(R⁵)₃ groups where R⁵ is a alkyl group containing 1 to 4 carbon atoms, and halogen atoms.

7. A process as defined in claim 1 wherein said silicon-containing preceramic polymer is a polysilazane.

8. A process as defined in claim 2 wherein said silicon-containing preceramic polymer is a polysilazane.

9. A process as defined in claim 7 wherein said polysilazane is prepared by prepared by contacting and reacting in an inert, essentially anhydrous, atmosphere, an organochlorosilane or a mixture of organochlorosilanes of the general formula $$R'_c SiCl_{(4-c)}$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

10. A process as defined in claim 8 wherein said polysilazane is prepared by contacting and reacting in an inert, essentially anhydrous, atmosphere, an organochlorosilane or a mixture of organochlorosilanes of the general formula $$R'_c SiCl_{(4-c)}$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

11. A process as defined in claim 7 wherein said polysilazane is prepared by contacting and reacting in an inert, essentially anhydrous, atmosphere, a chlorine-containing disilane or a mixture of chlorine-containing disilanes, of the general formula $$(Cl_d R'_e Si)_2$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5-3; e has a value of 0-2.5 and the sum of (d+e) is equal to three.

12. A process as defined in claim 8 wherein said polysilazane is prepared by contacting and reacting in an inert, essentially anhydrous, atmosphere, a chlorine-containing disilane or a mixture of chlorine-containing disilanes, of the general formula $$(Cl_d R'_e Si)_2$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5-3; e has a value of 0-2.5 and the sum of (d+e) is equal to three.

13. A process as defined in claim 7 wherein said polysilazane is prepared by contacting and reacting in an inert, essentially anhydrous, atmosphere, a mixture of (1) chlorine-containing disilane or a mixture of chlorine-containing disilanes, of the general formula $$(Cl_d R'_e Si)_2$$

and (2) an organochlorosilane or a mixture of organochlorosilanes of the general formula $$R'_c SiCl_{(4-c)}$$

with a disilazane having the general formula $$(R_3Si)_2NH$$

at a temperature in the range of 25° C. to 300° C. while distilling byproducted volatile products, wherein R' is selected from the group consisting of vinyl, phenyl, and alkyl radicals containing 1 to 3 carbon atoms; R is selected from the group consisting of vinyl, hydrogen, phenyl and alkyl radicals containing 1 to 3 carbon atoms; d has a value of 0.5-3; e has a value of 0-2.5; the sum of (d+e) is equal to three; and c has a value of 1 or 2.

14. A process as defined in claim 8 wherein said polysilazane is prepared by contacting and reacting in an inert, essentially anhydrous, atmosphere, a mixture of (1) chlorine-containing disilane or a mixture of chlorine-containing disilanes, of the general formula $$(Cl_d R'_e Si)_2$$

and (2) an organochlorosilane or a mixture of organochlorosilanes of the general formula $$R'_c SiCl_{(4-c)}$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5-3; e has a value of 0-2.5; the sum of (d+e) is equal to three; and c has a value of 1 or 2.

15. A process as defined in claim 7 wherein said polysilazanes is prepared by contacting and reacting in an inert, essentially anhydrous atmosphere, trichlorosilane with a disilazane at a temperature in the range of 25°

C. to 300° C. while removing byproduced volatile products, wherein said disilazane has the general formula (R$_3$Si)$_2$NH where R is selected from the group consisting of vinyl, hydrogen, phenyl, and alkyl radicals containing 1 to 3 carbon atoms.

16. A process as defined in claim 8 wherein said polysilazanes is prepared by contacting and reacting in an inert, essentially anhydrous atmosphere, trichlorosilane with a disilazane at a temperature in the range of 25° C. to 300° C. while removing byproduced volatile products, wherein said disilazane has the general formula (R$_3$Si)$_2$NH where R is selected from the group consisting of vinyl, hydrogen, phenyl, and alkyl radicals containing 1 to 3 carbon atoms.

17. A process as defined in claim 1 wherein said silicon-containing preceramic polymer is a polysilane.

18. A process as defined in claim 2 wherein said silicon-containing preceramic polymer is a polysilane.

19. A process as defined in claim 1 wherein said silicon-containing preceramic polymer is an organosilsesquioxane-containing sol-gel.

20. A process as defined in claim 2 wherein said silicon-containing preceramic polymer is an organosilsesquioxane-containing sol-gel.

21. A process as defined in claim 1 wherein said silicon-containing preceramic polymer is an organopolysiloxane.

22. A process as defined in claim 2 wherein said silicon-containing preceramic polymer is an organopolysiloxane.

23. A process for preparing a ceramic material with reduced carbon levels comprising heating a silicon-containing preceramic polymer in the presence of ammonia gas in a thermally staged sequence up to and including temperatures in excess of 900° C. to obtain a ceramic material with reduced carbon levels.

24. A process as defined in claim 23 wherein said silicon-containing preceramic polymer is selected from the group consisting of polycarbosilanes, polysilazanes, polysilanes, organosilsesquioxane-containing sol-gels, and organopolysiloxanes.

25. A process as defined in claim 23 wherein said silicon-containing preceramic polymer is a polycarbosilane prepared by thermally decomposing and polycondensing a polysilane or polysilanes by heating said polysilane or polysilanes at a temperature of 300°-700° C. in an inert gas, hydrogen, or vacuum wherein said polysilane or polysilanes are selected from the group consisting of cyclic polysilanes of the general formula (R$^1$R$^2$Si)$_n$ and linear polysilanes of the general formula

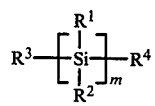

where n is greater than or equal to 4; where m is greater than or equal to 2; and where R$^1$, R$^2$, R$^3$, and R$^4$ are independently selected from the group consisting of hydrogen, alkyl groups containing 1 to 4 carbon atoms, phenyl, —Si(R$^5$)$_3$ groups where R$^5$ is a alkyl group containing 1 to 4 carbon atoms, and halogen atoms.

26. A process as defined in claim 23 wherein said silicon-containing preceramic polymer is a polysilazane prepared by contacting and reacting in an inert, essentially anhydrous, atmosphere, an organochlorosilane or a mixture of organochlorosilanes of the general formula R'$_c$SiCl$_{(4-c)}$ with a disilazane having the general formula (R$_3$Si)$_2$NH at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms, and c has a value of 1 or 2.

27. A process as defined in claim 23 wherein said silicon-containing preceramic polymer is a polysilazane prepared by contacting and reacting in an inert, essentially anhydrous, atmosphere, a chlorine-containing disilane or a mixture of chlorine-containing disilanes, of the general formula (Cl$_d$R'$_e$Si )$_2$ with a disilazane having the general formula (R$_3$Si)$_2$NH at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5-3; e has a value of 0-2.5 and the sum of (d+e) is equal to three.

28. A process as defined in claim 23 wherein said silicon-containing preceramic polymer is a polysilazane prepared by contacting and reacting in an inert, essentially anhydrous, atmosphere, a mixture of (1) chlorine-containing disilane or a mixture of chlorine-containing disilanes, of the general formula (Cl$_d$R'$_e$Si)$_2$ and (2) an organochlorosilane or a mixture of organochlorosilanes of the general formula R'$_c$SiCl$_{(4-c)}$ with a disilazane having the general formula (R$_3$Si)$_2$NH at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5-3; e has a value of 0-2.5; the sum of (d+e) is equal to three; and c has a value of 1 or 2.

29. A process as defined in claim 23 wherein said silicon-containing preceramic polymer is a polysilazane prepared by contacting and reacting in an inert, essentially anhydrous atmosphere, trichlorosilane with a disilazane at a temperature in the range of 25° C. to 300° C. while removing byproduced volatile products, wherein said disilazane has the general formula $$(R_3Si)_2NH$$

where R is selected from the group consisting of vinyl, hydrogen, phenyl and alkyl radicals containing 1 to 3 carbon atoms.

* * * * *